United States Patent
Iwata et al.

(10) Patent No.: US 8,928,786 B2
(45) Date of Patent: Jan. 6, 2015

(54) SOLID-STATE IMAGING APPARATUS AND METHOD OF DRIVING THE SAME

(75) Inventors: Koichiro Iwata, Kawasaki (JP); Hiroki Hiyama, Sagamihara (JP); Tetsuya Itano, Sagamihara (JP); Kohichi Nakamura, Kawasaki (JP); Kazuhiro Saito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 184 days.

(21) Appl. No.: 13/611,476

(22) Filed: Sep. 12, 2012

(65) Prior Publication Data

US 2013/0088625 A1 Apr. 11, 2013

(30) Foreign Application Priority Data

Oct. 7, 2011 (JP) ................................. 2011-223340

(51) Int. Cl.
*H04N 5/335* (2011.01)
*H04N 5/365* (2011.01)

(52) U.S. Cl.
CPC .................................. *H04N 5/3658* (2013.01)
USPC ............................ 348/294; 348/302; 348/301

(58) Field of Classification Search
CPC ...................................................... H04N 5/335
USPC ................................................... 348/294, 302
See application file for complete search history.

(56) References Cited

U.S. PATENT DOCUMENTS

| | | | |
|---|---|---|---|
| 6,188,094 B1 | 2/2001 | Kochi et al. | 257/232 |
| 6,670,990 B1 | 12/2003 | Kochi et al. | 348/310 |
| 6,960,751 B2 | 11/2005 | Hiyama et al. | 250/208.1 |
| 7,110,030 B1 | 9/2006 | Kochi et al. | 348/308 |
| 7,126,102 B2 | 10/2006 | Inoue et al. | 250/214 |
| 7,187,052 B2 | 3/2007 | Okita et al. | 257/444 |
| 7,321,110 B2 | 1/2008 | Okita et al. | 250/208.1 |
| 7,408,210 B2 | 8/2008 | Ogura et al. | 257/233 |
| 7,429,764 B2 | 9/2008 | Koizumi et al. | 257/292 |
| 7,460,162 B2 | 12/2008 | Koizumi et al. | 348/294 |
| 7,462,810 B2 | 12/2008 | Kobayashi et al. | 250/208.1 |
| 7,528,878 B2 | 5/2009 | Sato et al. | 348/317 |
| 7,538,804 B2 | 5/2009 | Okita et al. | 348/241 |
| 7,550,793 B2 | 6/2009 | Itano et al. | 257/239 |
| 7,557,847 B2 | 7/2009 | Okita et al. | 348/308 |
| 7,592,579 B2 | 9/2009 | Tamura et al. | 250/208.1 |

(Continued)

FOREIGN PATENT DOCUMENTS

| | | | | |
|---|---|---|---|---|
| JP | 2001-197378 A | 7/2001 | | |
| JP | 2001197378 | * | 7/2001 | H04N 5/335 |

*Primary Examiner* — Nhan T Tran
*Assistant Examiner* — Chan Nguyen
(74) *Attorney, Agent, or Firm* — Fitzpatrick, Cella, Harper & Scinto

(57) ABSTRACT

A solid-state imaging apparatus includes: a plurality of pixels arranged in a matrix; a plurality of amplifier circuits each arranged correspondingly to each of columns of the pixels, for amplifying a signal from the pixel; and a current source transistor whose source is supplied with a power source voltage and which supplies the amplifier circuit with a bias current. When the current source transistor is operating in the saturation region, the gate voltage of the current source transistor that is supplied from the bias line is sampled and held. The gate voltage of the current source transistor with respect to the power source voltage is controlled to the sampled voltage, thereby suppressing variation. This suppression can, in turn, suppress occurrence of line noise and a lateral smear due to difference of drop in voltage of a power source line concerning a column circuit on each row.

12 Claims, 8 Drawing Sheets

(56) References Cited

U.S. PATENT DOCUMENTS

| | | | |
|---|---|---|---|
| 7,638,826 B2 | 12/2009 | Hiyama et al. | 257/291 |
| 7,719,587 B2 | 5/2010 | Ogura et al. | 348/302 |
| 7,741,593 B2 | 6/2010 | Iwata et al. | 250/214 |
| 7,755,688 B2 | 7/2010 | Hatano et al. | 348/300 |
| 7,812,873 B2 | 10/2010 | Hiyama et al. | 348/294 |
| 7,812,876 B2 | 10/2010 | Hiyama et al. | 348/300 |
| 7,825,974 B2 | 11/2010 | Itano et al. | 348/308 |
| 7,920,192 B2 | 4/2011 | Watanabe et al. | 348/308 |
| 7,982,789 B2 | 7/2011 | Watanabe et al. | 348/308 |
| 8,013,369 B2 | 9/2011 | Iwata et al. | 257/290 |
| 8,023,025 B2 | 9/2011 | Itano et al. | 348/308 |
| 8,045,034 B2 | 10/2011 | Shibata et al. | 348/308 |
| 8,081,245 B2 | 12/2011 | Itano et al. | 348/301 |
| 8,085,319 B2 | 12/2011 | Ono et al. | 348/241 |
| 8,106,955 B2 | 1/2012 | Okita et al. | 348/220.1 |
| 8,159,577 B2 | 4/2012 | Iwata et al. | 348/296 |
| 8,208,055 B2 | 6/2012 | Hiyama | 348/300 |
| 8,218,050 B2 | 7/2012 | Ogura et al. | 348/308 |
| 8,289,431 B2 | 10/2012 | Itano | 348/308 |
| 8,325,260 B2 | 12/2012 | Yamazaki et al. | 348/308 |
| 2009/0219424 A1 | 9/2009 | Sonoda et al. | 348/302 |
| 2009/0322922 A1 | 12/2009 | Saito et al. | 348/308 |
| 2010/0060762 A1 | 3/2010 | Takada et al. | 348/300 |
| 2010/0201856 A1 | 8/2010 | Hayashi et al. | 348/296 |
| 2010/0271517 A1* | 10/2010 | De Wit et al. | 348/294 |
| 2010/0295978 A1 | 11/2010 | Nakamura et al. | 348/273 |
| 2010/0309356 A1* | 12/2010 | Ihara et al. | 348/300 |
| 2012/0026371 A1 | 2/2012 | Itano et al. | 348/301 |
| 2012/0194715 A1* | 8/2012 | Skaug | 348/300 |
| 2013/0308023 A1* | 11/2013 | Sugawa et al. | 348/294 |

\* cited by examiner

SOLID-STATE IMAGING APPARATUS AND METHOD OF DRIVING THE SAME

BACKGROUND OF THE INVENTION

1. Field of the Invention

The present invention relates to a solid-state imaging apparatus and a method of driving the same.

2. Description of the Related Art

In recent years, solid-state imaging apparatuses, such as CMOS image sensors, have been achieving high performance and high functionality. One of these achievements is advancement in multi-pixel configuration of imaging devices for providing high resolution images. Accordingly, the number of circuits for reading pixel signals is increased, which in turn increases consumption current and also increases drop in voltage of a power source line. Thus, operating points of read out circuits connected to a common power source line are different depending on the positions, which causes horizontal shading.

To address this problem, Japanese Patent Application Laid-Open No. 2001-197378 takes measures to hold the gate voltage of a current source transistor, which supplies current to read out circuits (column circuits) arranged for respective columns, in a capacitor connected between a reference potential and the gate of the current source transistor during the column circuit being not in operation. In a period when the column circuit does not operate, that is, without drop in voltage of a power source line, the gate voltage of the current source transistor is held in the capacitor connected to the reference potential. Accordingly, even if the power source (reference) voltage drops after the column circuit operates, the gate voltage, i.e. voltage Vgs, of the current source transistor with respect to the reference potential becomes constant and thus the current values of the column circuits become the same. The problem of horizontal shading is therefore alleviated and solved.

SUMMARY OF THE INVENTION

Unfortunately, in a solid-state imaging apparatus that horizontally transfers a pixel signal concurrently with an operation of reading the pixel signal and performs analog-to-digital conversion in a chip to output a digital signal, the duration of time for reading one row is largely affected by time required for the operation of reading the pixel signal. Accordingly, a period in which a column circuit is in an off state (non-operating state) is shortened or not afforded. In the case without a period for causing the column circuit to be in the off state, following problems can occur.

For instance, in consideration of conditions where the following both terms (1) and (2) are satisfied in the identical imaging surface, sampled gate voltages differ among column circuits.

(1) A column where strong light is incident to saturate the column circuit when a certain row is read and a current source transistor operates in a linear region (2) A column without strong light where the current source transistor of the column circuit operates in a saturation region That is, in the state of term (1) where the current source transistor is in the linear operation, the drop in voltage of the power source line is small. Accordingly, the gate voltage of the current source transistor sampled at this time is different from a gate voltage sampled in the state of term (2). This difference may cause line noise, in which output levels differ among rows, and a lateral smear, in which output levels at the lateral ends of a highly bright object differ from levels at the other part to result in a streaky strip.

According one an aspect of the present invention, a solid-state imaging apparatus comprises: a plurality of pixels arranged in a matrix; a plurality of amplifier circuits each arranged correspondingly to each of columns of the pixels, the amplifier configured to amplify a signal from the pixel; a current source transistor arranged correspondingly to each of amplifier circuits, the current source transistor configured to supply a bias current to a corresponding one of the amplifier circuits and the current source transistor having a source supplied with a power source voltage; a sampling unit configured to sample, as a sampling voltage, a gate voltage of the current source transistor supplied from a bias line; and a holding unit configured to hold the voltage sampled by the sampling unit, and control a gate voltage thereafter of the current source transistor into the sampling voltage, wherein, in a period of operating the current source transistor in a saturation region, the gate voltage of the current source transistor is sampled and held.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Embodiments of the present invention will hereinafter be described with reference to drawings.

Figure 1:
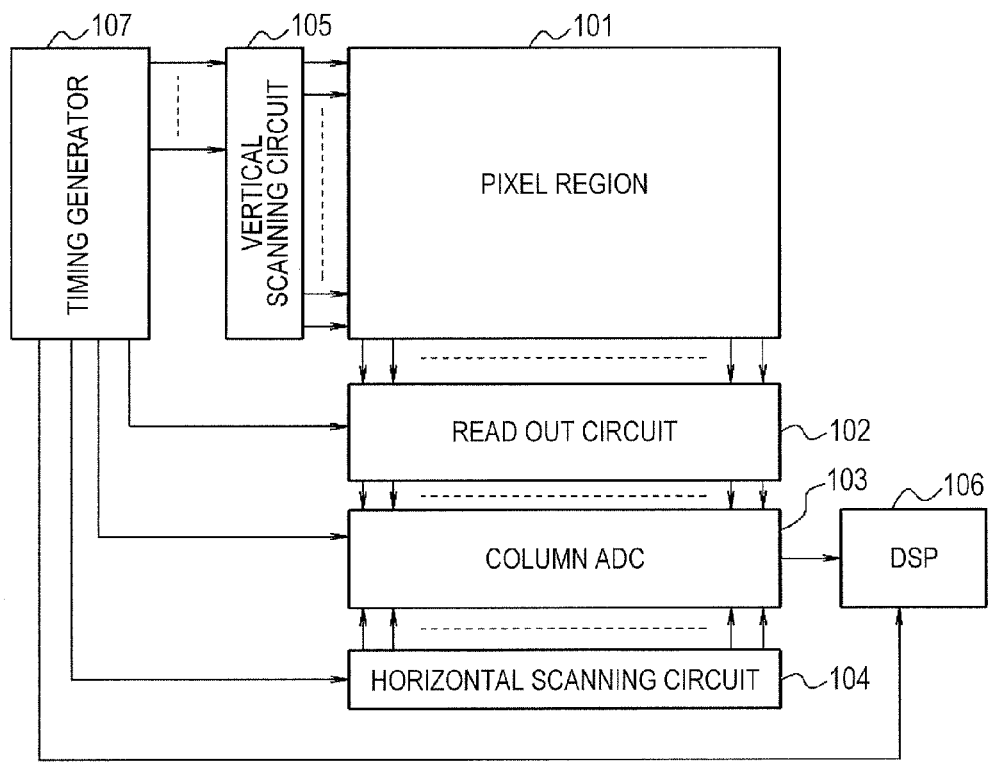
FIG. 1 is a diagram illustrating an example of a configuration of a solid-state imaging apparatus according to an embodiment of the present invention.

First, a solid-state imaging apparatus according to one embodiment of the present invention will now be described. FIG. 1 is a block diagram illustrating an example of the configuration of a solid-state imaging apparatus according to the embodiment of the present invention. The solid-state imaging apparatus includes a pixel region 101, a read out circuit 102, a column analog-to-digital converter (column ADC) 103, a horizontal scanning circuit 104, a vertical scanning circuit 105, a digital signal processor (DSP) 106 and a timing generator 107.

Figure 2:
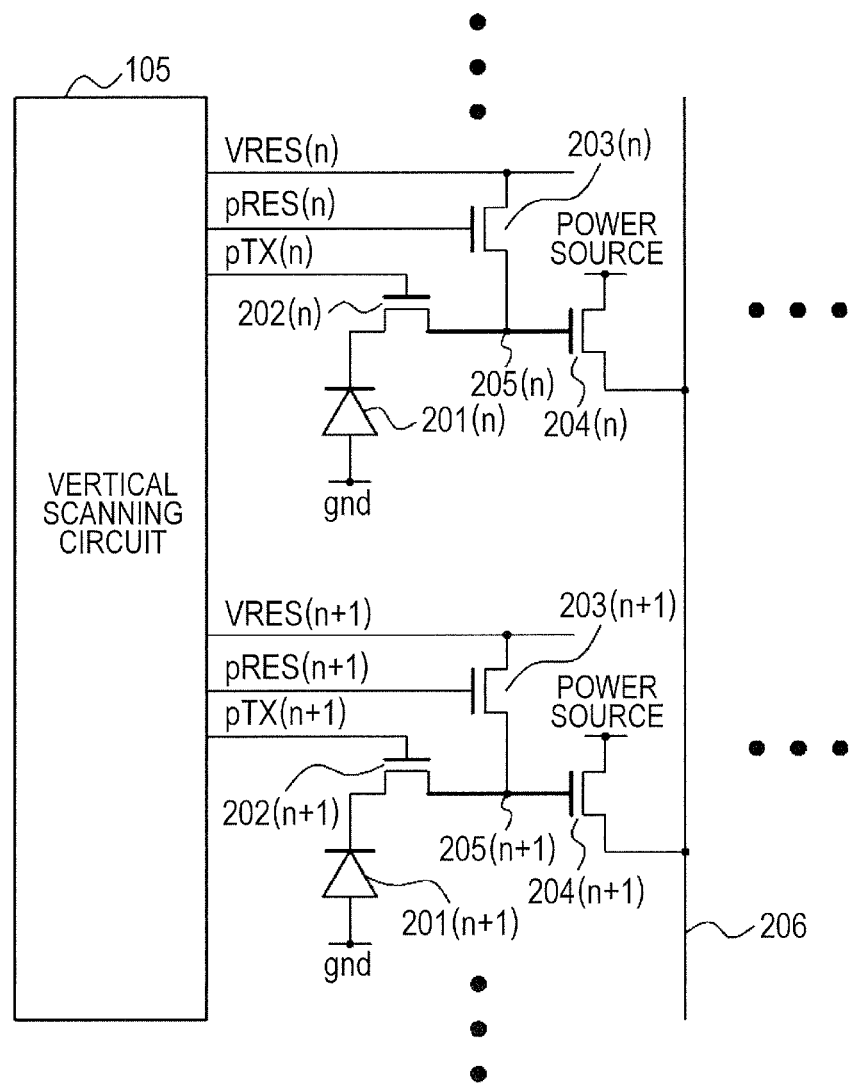
FIG. 2 is a diagram illustrating an example of a configuration of a pixel according to the embodiment of the present invention.

The pixel region 101 is provided with a plurality of pixels including photoelectric conversion elements as illustrated in FIG. 2. The pixels are arranged in a matrix (in a row direction and a column direction). In the read out circuit 102, circuits that read a pixel signal from the pixels of the pixel region 101 and amplify the signal are arranged correspondingly to the respective columns of the pixel region 101. The column ADC 103 performs analog-to-digital conversion on the read pixel signal. The horizontal scanning circuit 104 reads the digital signal subjected to the analog-to-digital conversion by the column ADC 103 and sequentially transfers the signal to the DSP 106. The vertical scanning circuit 105 performs control for reading the pixel signal in the pixel region 101 sequentially in the vertical direction. The DSP 106 performs a prescribed process on the digital signal transferred from the horizontal scanning circuit 104. The timing generator 107 outputs control pulses to thereby control the read out circuit 102, the column ADC 103, the horizontal scanning circuit 104, the vertical scanning circuit 105 and the DSP 106.

FIG. 2 is a diagram illustrating an example of a circuit configuration of the pixel in this embodiment. Each pixel in the pixel region 101 includes a photoelectric conversion element 201 and three MOS transistors 202, 203 and 204. The photoelectric conversion element 201 generates charge by photoelectric conversion. The photoelectric conversion element 201 is, for instance, a photodiode (PD). The transistor 202 is a transfer transistor (transfer switch) for transferring charge accumulated by photoelectric conversion in the photoelectric conversion element 201 to a floating diffusion portion 205. The transistor 203 is a reset transistor (reset switch) for resetting the floating diffusion portion 205 and the photoelectric conversion element 201. The transistor 204 is a source follower transistor (amplifier circuit) for determining the voltage of a pixel signal output line 206 by the potential of the floating diffusion portion 205. In the transistor 204, the gate is connected to the floating diffusion portion 205, the source is connected to the pixel signal output line 206, and the drain is connected to a power source.

A power source line VRES, which is for resetting the floating diffusion portion 205, is connected to the drain of the reset transistor 203. The potential of the power source line VRES is set to a high potential VRESH for resetting the floating diffusion portion 205 to a high potential, and set to a low potential VRESL for resetting the floating diffusion portion 205 to a low potential. pRES is connected to the gate of the reset transistor 203, and set to a high level for writing the potential of the power source line VRES into the floating diffusion portion 205. pTX is a control line for transferring, to the floating diffusion portion 205, the charge photoelectrically converted by the photoelectric conversion element 201, and is connected to the gate of the transfer transistor 202 and set to a high level for reading the photoelectric conversion element 201.

Figure 3:
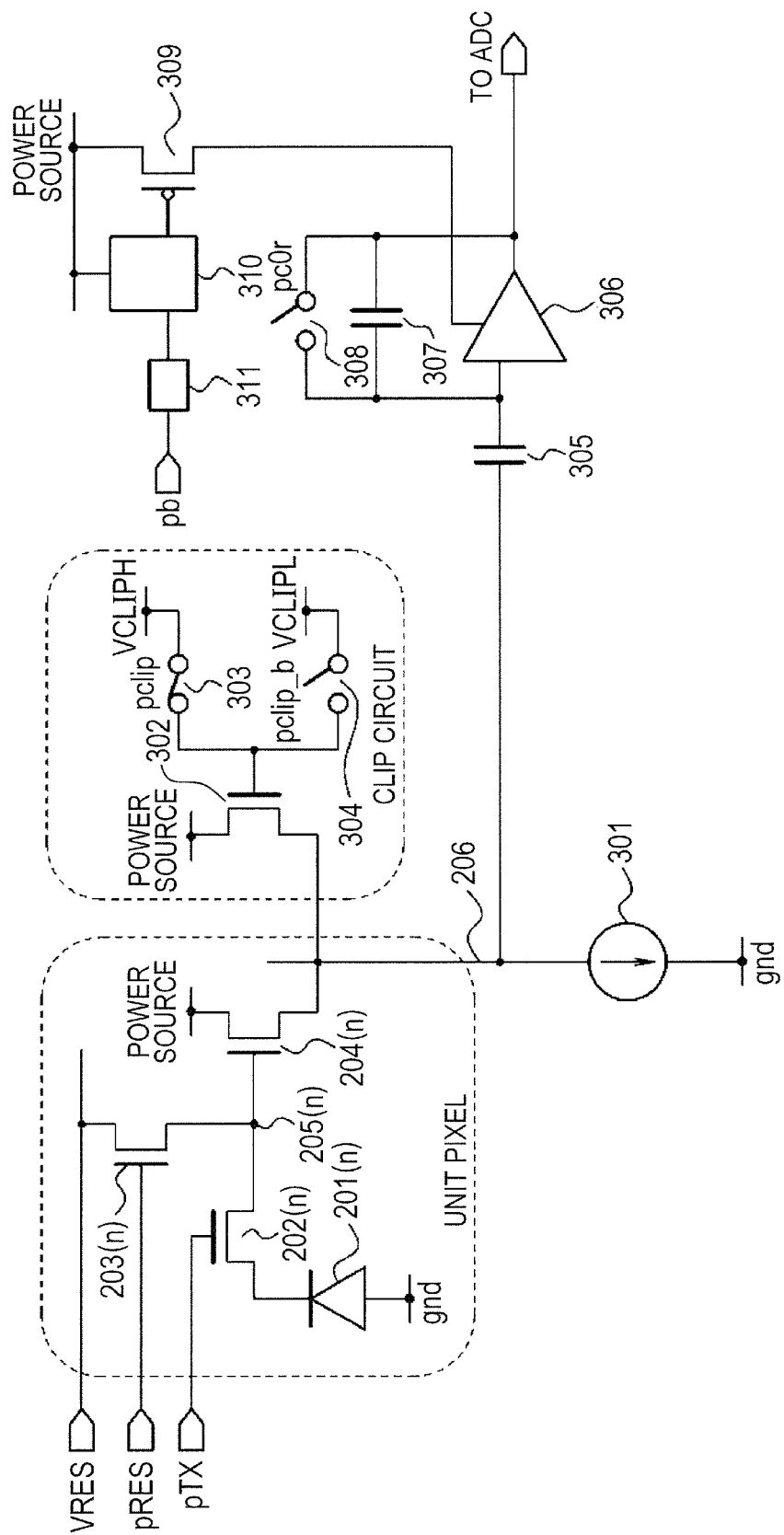
FIG. 3 is a diagram illustrating an example of a configuration of a signal read out unit according to the embodiment of the present invention.

FIG. 3 is a diagram illustrating an example of a configuration of a signal read out unit in this embodiment. In FIG. 3, identical symbols are assigned to components identical to the components illustrated in FIG. 2. The redundant description is omitted.

In FIG. 3, a clip transistor 302 fixes the pixel signal output line 206 to any voltage. In resetting of the floating diffusion portion 205, a switch 303 is turned on to thereby apply a voltage VCLIPH to the gate of the clip transistor 302. When the transfer transistor 202 is turned on and charge in the photoelectric conversion element 201 is read, a switch 304 is turned on to thereby apply a voltage VCLIPL to the gate of the clip transistor 302. The switch 303 is controlled by a signal pclip. The switch 304 is controlled by a signal pclip_b, which is an inverted signal of the signal pclip.

A clip circuit including the clip transistor 302 and the switches 303 and 304 is a voltage fixing unit for fixing the pixel signal output line 206, i.e. the input of an amplifier circuit, to any voltage. For instance, when strong light is incident, the clip circuit suppresses decrease in potential of the floating diffusion portion 205 due to charge overflowing from the photoelectric conversion element 201 and thereby suppresses decrease in voltage of the pixel signal output line 206. The suppression secures the dynamic range of the pixel signal output line 206, and suppresses being blocked up shadows (losing a gradation) when a highly bright object is imaged.

A load current source 301 is for the source follower transistor 204 and the clip transistor 302. An amplifier circuit 306 is arranged correspondingly to each column, and amplifies a signal read from the pixel. A clamp capacitor 305 clamps the voltage of the pixel signal output line 206. A feedback capacitor 307 feeds the output of the amplifier circuit 306 back to the input of the amplifier circuit 306. The ratio between the capacitance value of the capacitor 305 and the capacitance value of the capacitor 307 determines the gain of the amplifier circuit 306. A switch 308 resets the clamp capacitor 305 and is controlled according to a signal pc0r. With reference to the voltage of the pixel signal output line 206 clamped in the clamp capacitor 305 when the switch 308 is on (set in a conductive state), an amount of change therefrom in voltage of the pixel signal output line 206 is amplified by a factor of the gain in the amplifier circuit 306 and output.

Figure 4:
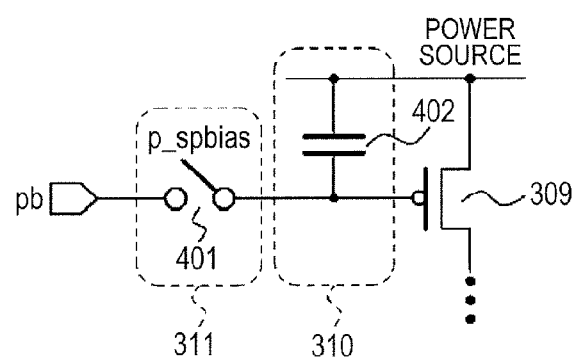
FIG. 4 is a diagram illustrating an example of configurations of a sampling unit and a holding unit according to the embodiment of the present invention.

The amplifier circuit 306 includes, for instance, a source-grounded amplifier circuit or an operational amplifier. A load current source 309 is for the amplifier circuit 306, and supplies the amplifier circuit 306 with a bias current. The current source 309 includes a PMOS transistor in this embodiment. The reference voltage is a power source voltage. The gate voltage of the current source transistor 309 is supplied from a bias line pb. A holding unit 310 holds the gate voltage of the current source transistor 309. A sampling unit 311 samples the gate voltage of the current source transistor 309 for the holding unit 310. The holding unit 310 holds the voltage sampled by the sampling unit 311, and controls the gate voltage of the current source transistor 309 with reference to the reference voltage to be the sampled voltage. As exemplified in FIG. 4, the sampling unit 311 is, for instance, a switch 401 controlled according to a signal p_spbias. The holding unit 310 is, for instance, a capacitor 402. The bias line pb and the gate of the current source transistor 309 are connected to each other via the switch 401. The capacitor 402 is connected between the gate of the current source transistor 309 and the power source line, through which the power source voltage as the reference voltage of the current source transistor 309 is supplied.

Next, an operation of the solid-state imaging apparatus according to the embodiment of the present invention will be described. In the following description, the high level of a pulse (signal) is denoted by "H" and the low level of the pulse (signal) is denoted by "L".

First Embodiment

Figure 5:
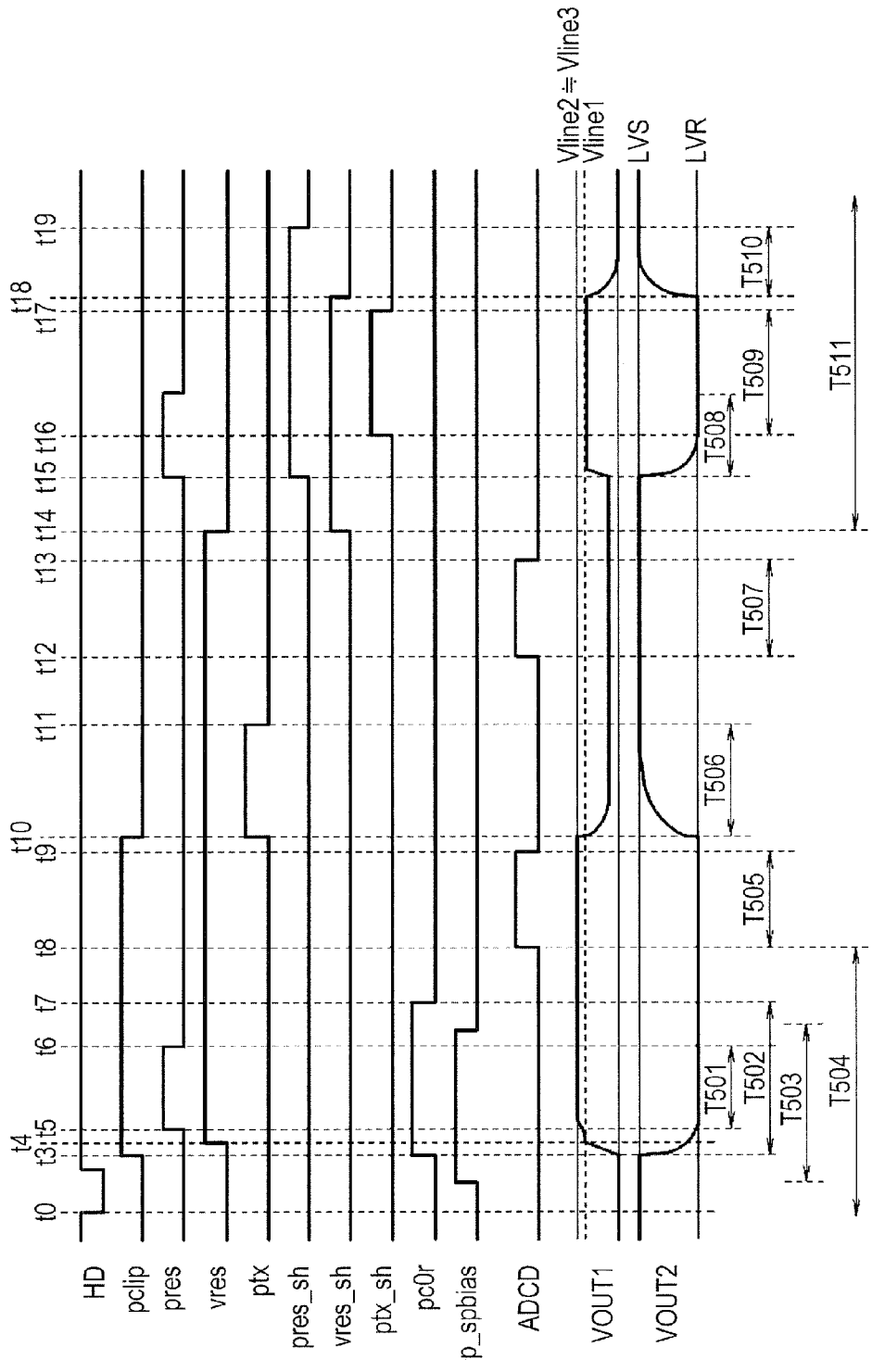
FIG. 5 is a diagram illustrating drive timing according to a first embodiment of the present invention.

FIG. 5 is a timing chart illustrating drive timing of the solid-state imaging apparatus according to a first embodiment. In the following description, during a period of an operation of reading a signal from the pixel, the read out circuit 102 is not set to an off state (non-operating state).

First, each pulse will be described.

A read out start signal HD is for a certain row in the pixel region 101. The read out start signal HD is supplied to the timing generator 107, thereby allowing the timing generator 107 to generate and output each control pulse, which will be described below.

A control pulse pclip controls the switch 303 of the clip circuit illustrated in FIG. 3. When the control pulse pclip is "H", the switch 303 is on (conductive state) and the gate voltage of the clip transistor 302 is set to the voltage VCLIPH. The switch 304 of the clip circuit is supplied with the signal pclip_b as the control pulse, which is the inverted signal of the control pulse pclip. When the control pulse pclip_b is "H" (the control pulse pclip is "L"), the switch 304 is on (conductive state) and the gate voltage of the clip transistor 302 is set to the voltage VCLIPL.

Control pulses pres are supplied to the gate of the reset transistor 203 of the pixel to be read, for controlling the reset transistor 203. When the control pulse pres is "H", the reset transistor 203 is on (conductive state).

A power source vres is connected to the drain of the reset transistor 203 of the pixel to be read. The high level is an arbitrary potential VRESH. The low level is an arbitrary potential VRESL.

Control pulses ptx are supplied to the gate of the transfer transistor 202 of the pixel to be read, for controlling the transfer transistor 202. When the control pulse ptx is "H", the transfer transistor 202 is on (conductive state).

Control pulses pres_sh are supplied to the gate of the reset transistor 203 of the pixel to be subjected to an electronic shutter, for controlling the reset transistor 203. When the control pulse pres_sh is "H", the reset transistor 203 is on (conductive state).

A power source vres_sh is connected to the drain of the reset transistor 203 of the pixel to be subjected to the electronic shutter. The high level and the low level in the power source vres_sh are the same as those of the power source vres.

Control pulses ptx_sh are supplied to the gate of the transfer transistor 202 of the pixel to be subjected to the electronic shutter, for controlling the transfer transistor 202. When the control pulse ptx_sh is "H", the transfer transistor 202 is on (conductive state).

Control pulses pc0r are applied to the switch 308 illustrated in FIG. 3, for resetting the clamp capacitor 305 of the amplifier circuit. When the control pulse pc0r is "H", the switch 308 is on (conductive state) to reset the amplifier circuit.

Control pulses p_spbias control the switch 401, which is the sampling unit 311, to sample the potential of the bias line pb in the capacitor 402, which is the holding unit 310. When the control pulse p_spbias is "H", the switch 401 is on (conductive state).

In the drawing, ADCD denotes an execution period of an A/D conversion operation. During "H", the A/D conversion operation is performed. A potential VOUT1 is of the image signal output line 206. An output potential VOUT2 is of the amplifier circuit. A saturation level LVS, and a reset level LVR are illustrated.

At time t0, the read out start signal HD becomes "L", the timing generator 106 generates the respective control pulses, and an operation of reading a certain row is started.

At time t3, the control pulses pclip are set to "H", the switch 303 of the clip circuit is turned on and the gate voltage of the clip transistor 302 is set to the voltage VCLIPH. Furthermore, the control pulses pc0r are set to "H", and the amplifier circuit 306 is reset.

At this time, the gate voltage of the clip transistor 302 is set to the voltage VCLIPH, thereby allowing the voltage of the pixel signal output line 206 to be clipped by the clip transistor 302, and the voltage becomes Vline1 represented in following (Equation 1).

$$Vline1 = VCLIPH - Vth - \Delta Vod \quad (1)$$

where Vth is a threshold voltage of the clip transistor 302 and $\Delta Vod$ is an overdrive voltage of the clip transistor 302.

The amplifier circuit 306 is reset. Accordingly, the output of the amplifier circuit 306 is initialized irrespective of the voltage of the pixel signal output line 206, and the current source transistor 309, which is an output load of the amplifier circuit, operates in the saturation region.

At time t4, the power source vres is set to "H"; that is, the voltage of the drain of the reset transistor 203 on the pixel row to be read is set to the voltage VRESH.

At time t5, the control pulses pres is set to "H", the reset transistor 203 on the pixel row to be read is turned on, and the potential of the floating diffusion portion 205 is reset to the voltage VRESH.

This operation is for allowing the voltage of the pixel signal output line 206 to be determined by the gate voltage of the source follower transistor 204 of the pixel to be read, and called a selecting operation.

At this time, the voltage of the pixel signal output line 206 becomes Vline2 represented in following (Equation 2).

$$Vline2 = VRESH - Vthsf - \Delta Vodsf \quad (2)$$

where Vthsf is the threshold voltage of the source follower transistor 204 and $\Delta Vodsf$ is the overdrive voltage of the source follower transistor 204.

The magnitude relationship between the voltage Vline1 of the pixel signal output line 206 that is clipped by the clip transistor 302 and the voltage Vline2 of the pixel signal output line when the source follower transistor 204 of the pixel to be read is on is Vline1<Vline2.

At time t6, the control pulse pres is set to "L", the reset transistor 203 is turned off, the floating diffusion portion 205 is set floating, and the selecting operation on the pixel to be read is finished.

At time t7, the control pulse pc0r is set to "L", the switch 308 is turned off, and the reset operation on the amplifier circuit 306 is finished.

Subsequently, when the voltage of the pixel signal output line 206 is changed, the amount of change is amplified by the amplifier circuit 306 and supplied to the subsequent circuit (A/D converter in this embodiment).

At time t8, an A/D conversion process on the reset level (N signal) of the floating diffusion portion 205 is started. At time t9, the A/D conversion process on the N signal is finished.

At time t10, the control pulse pclip is set to "L", the switch 303 is turned off and the switch 304 is turned on. Accordingly, the gate voltage of the clip transistor 302 is set to the voltage VCLIPL. The control pulse ptx is set to "H", the transfer transistor 202 of the pixel to be read is turned on, and the charge accumulated by photoelectric conversion in the photoelectric conversion element 201 is transferred to the floating diffusion portion 205. Accordingly, the voltage of the pixel signal output line 206 is reduced by the amount of charge accumulated in the photoelectric conversion element 201. The reduced voltage is inverted and amplified by the amplifier circuit 306. At this time, the amount of photoelectrically converted charge is large. Accordingly, if the output of the amplifier circuit 306 is saturated, the drain voltage of the current source transistor 309 is increased and the current source transistor 309 operates according to a linear operation. In this embodiment, at time t10, the output of the amplifier circuit 306 is saturated, and the current source transistor 309 operates according to the linear operation.

At time t11, the control pulse ptx is set to "L", the transfer transistor 202 of the pixel to be read is turned off, and reading (transfer) of the charge photoelectrically converted by the photoelectric conversion element 201 to the floating diffusion portion 205 is finished.

At time t12, an A/D conversion process on the signal (S signal) read from the photoelectric conversion element 201 is started. At time t13, the A/D conversion process on the S signal is finished.

At time t14, the power source vres of the pixel to be read is set to "L", that is, the voltage of the drain of the reset transistor 203 on the pixel row to be read is set to the voltage VRESL. The power source vres_sh is set to "H", that is, the voltage of the drain of the reset transistor 203 of the pixel to be subjected to the electronic shutter is set to the voltage VRESH.

At time t15, the control pulse pres of the pixel to be read is set to "H", the potential of the floating diffusion portion 205 is reset to VRESL, and a non-selecting operation is performed. The control pulse pres_sh is set to "H", the reset transistor 203 of the pixel to be subjected to the electronic shutter is turned on, and the potential of the floating diffusion portion 205 is set to the voltage VRESH.

The gate voltage of the source follower transistor 204 of the pixel to be subjected to the electronic shutter is set to the voltage VRESH. Accordingly, the voltage of the pixel signal output line 206 becomes Vline3 represented in following (Equation 3).

$$Vline3 = VRESH - Vthsf - \Delta Vodsf \quad (3)$$

where Vthsf is the threshold voltage of the source follower transistor 204 and ΔVodsf is the overdrive voltage of the source follower transistor 204. At this time, if the pixels on a plurality of rows are to be simultaneously reset, the value of current caused to flow by one source follower transistor 204 decreases and the overdrive voltage ΔVodsf decreases. Accordingly, the voltage Vline3 of the pixel signal output line 206 where the potential of the floating diffusion portion 205 of the pixel to be subjected to the electronic shutter is reset to the voltage VRESH becomes higher than the voltage Vline2. However, this point is not essential in this embodiment. Accordingly, for simplicity's sake, it is set such that Vline2=Vline3.

The voltage of the pixel signal output line 206 is increased to a level that is close to the level when the pixel to be read is subjected to the selecting operation. Accordingly, the output of the amplifier circuit 306 is reduced, and the current source transistor 309 returns to the operation in the saturation region again.

At time t16, the control pulse ptx_sh is set to "H", the transfer transistor 202 of the pixel to be subjected to the electronic shutter is turned on, and the photoelectric conversion element 201 is reset via the reset transistor 203 and the transfer transistor 202.

At time t17, the control pulse ptx_sh is set to "L", the transfer transistor 202 of the pixel to be subjected to the electronic shutter is turned off, and resetting of the photoelectric conversion element 201 is finished.

At time t18, the power source vres_sh is set to "L", that is, the voltage of the drain of the reset transistor 203 of the pixel row to be subjected to the electronic shutter is set to the voltage VRESL. Since the reset transistor of the pixel to be subjected to the electronic shutter is still on at this time, the potential of the floating diffusion portion 205 is set to voltage VRESL. Accordingly, the voltage of the pixel signal output line 206 is reduced again, and the output of the amplifier circuit 306 is saturated.

At time t19, the control pulse pres_sh is set to "L", the reset transistor 203 of the pixel subjected to the electronic shutter is turned off.

Here, FIG. 5 illustrates a selecting operation period T501 for the pixel to be read, a reset period T502 for the amplifier circuit 306, a sampling period T503 for the gate voltage (the potential of the bias line pb) of the current source transistor 309, and a horizontal transfer period T504. The drawing further illustrates an A/D conversion period T505 for the N signal, a charge read out period T506 for the pixel to be read, an A/D conversion period T507 for the S signal, a non-selecting operation period T508 for the pixel to be read out, an electronic shutter period T509, a non-selecting operation period T510 for the pixel to be subjected to the electronic shutter, and a horizontal transfer period T511.

In this embodiment, as illustrated as the period T503, before time t3 at which the control pulse pc0r is set to "H", the control pulse p_spbias is set to "H" and the switch 401 as the sampling unit 311 is turned on. Thus, writing of the potential of the bias line pb (the gate voltage of the current source transistor 309) into the capacitor 402 as the holding unit 310 is started. Before time t7 at which the control pulse pc0r is set to "L", the control pulse p_spbias is set to "L", the switch 401 as the sampling unit 311 is turned off, and writing of the potential of the bias line pb into the capacitor 402 as the holding unit 310 is finished.

That is, in the period during which the amplifier circuit 306 is reset (in the period during which the current source transistor 309 operates in the saturation region), writing of the potential of the bias line pb (the gate voltage of the current source transistor 309) into the holding unit 310 is finished. Thus, according to the first embodiment, the potential of the bias line pb is sampled and held in a state where the current source transistor 309 is operating in the saturation region, thereby allowing variation in gate voltage of the current source transistor 309 with respect to the reference potential to be suppressed. This suppression can, in turn, suppress occurrence of line noise and a lateral smear due to difference of drop in voltage of the power source line concerning the column circuit on each row even when horizontal transfer of the pixel signal and reading of the pixel signal are concurrently performed. Accordingly, a high quality image can be provided.

Second Embodiment

Figure 6:
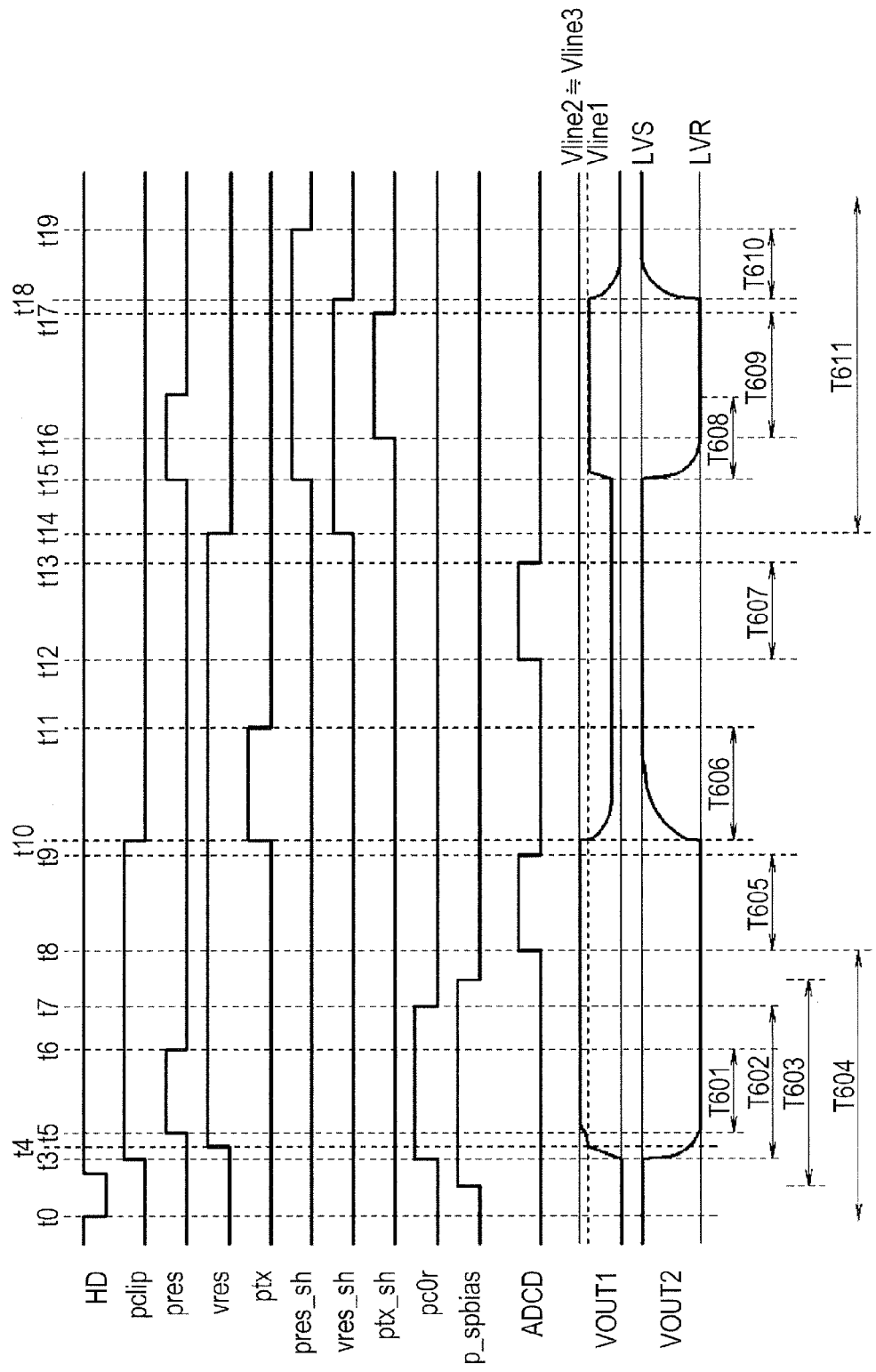
FIG. 6 is a diagram illustrating drive timing according to a second embodiment of the present invention.

FIG. 6 is a timing chart illustrating driving timing of a solid-state imaging apparatus according to a second embodiment. Operations for each of control pulses and at time t0, t3 to t19 are analogous to those in the first embodiment. Accordingly, the description thereof is omitted. FIG. 6 illustrates a selecting operation period T601 for the pixel to be read, a reset period T602 for amplifier circuit 306, a sampling period T603 for the gate voltage (the potential of the bias line pb) for the current source transistor 309, and a horizontal transfer period T604. The drawing also illustrates an A/D conversion period T605 for the N signal, a charge read out period T606 for the pixel to be read, an A/D conversion period T607 is for the S signal, and a non-selecting operation period T608 for the pixel to be read. The drawing further illustrates an electronic shutter period T609, a non-selecting operation period T610 for the pixel to be subjected to the electronic shutter, and a horizontal transfer period T611.

In the second embodiment, as illustrated as the period T603 in FIG. 6, before time t5 at which the control pulse pres is set to "H", the control pulse p_spbias is set to "H" and the switch 401 as the sampling unit 311 is turned on. Thus, writing of the potential of the bias line pb (the gate voltage of the current source transistor 309) into the capacitor 402 as the holding unit 310 is started. After the control pulses pres is set to "L" and before time t8 at which A/D conversion process is started, the control pulse p_spbias is set to "L". Thus, the switch 401 as the sampling unit 311 is turned off, and writing of the potential of the bias line pb into the capacitor 402 as the holding unit 310 is finished.

That is, the selecting operation on the pixel to be read is performed, and the voltage of the pixel signal output line 206 is returned to the initial state; in this state, the potential of the bias line pb (the gate voltage of the current source transistor 309) is written into the holding unit 310. At this time, the input level of the amplifier circuit 306 is in a state close to the initial state. Accordingly, the amplifier circuit 306 operates in a normal operating point, and the current source transistor 309 operates in the saturation region. Thus, according to the second embodiment, in the state where the current source transistor 309 is operating in the saturation region, the potential of the bias line pb is sampled and held, thereby allowing variation in gate voltage of the current source transistor 309 with respect to the reference potential to be suppressed. Accordingly, even when the horizontal transfer of the pixel signal and reading of the pixel signal are concurrently performed, occurrence of line noise and a lateral smear due to difference of drop in voltage of the power source line concerning the column circuit on each row can be suppressed. Accordingly, a high quality image can be provided.

Third Embodiment

Figure 7:
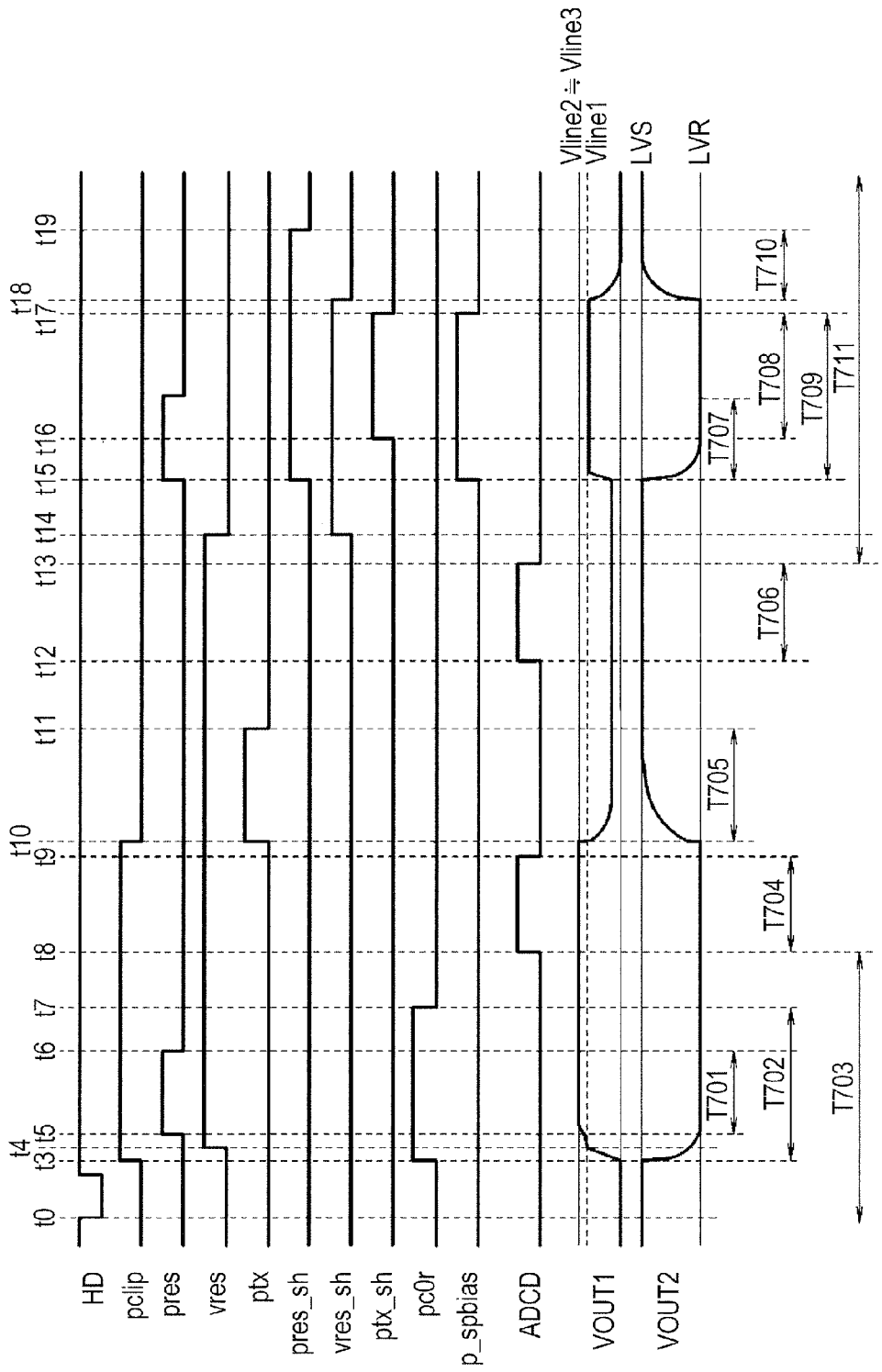
FIG. 7 is a diagram illustrating drive timing according to a third embodiment of the present invention.

FIG. 7 is a timing chart illustrating driving timing of a solid-state imaging apparatus according to a third embodiment. Operations for each of control pulses and at time t0, t3 to t19 are analogous to those in the first embodiment. Accordingly, the description thereof is omitted. FIG. 7 illustrates a selecting operation period T701 for the pixel to be read, a reset period T702 for the amplifier circuit 306, and a horizontal transfer period T703. The drawing also illustrates an A/D conversion period T704 for the N signal, a charge read out period T705 for the pixel to be read, an A/D conversion period T706 for the S signal, and a non-selecting operation period T707 for the pixel to be read. The drawing further illustrates an electronic shutter period T708, a sampling period T709 for the gate voltage of the current source transistor 309 (the potential of the bias line pb), a non-selecting operation period T710 for the pixel to be subjected to the electronic shutter, and a horizontal transfer period T711.

In the third embodiment, as illustrated as the period T709 in FIG. 7, at the substantially same time as time t15 when the control pulse pres_sh is set to "H", the control pulse p_spbias is set to "H" and the switch 401 as the sampling unit 311 is turned on. Thus, writing of the potential of the bias line pb (the gate voltage of the current source transistor 309) into the capacitor 402 as the holding unit 310 is started. Before time t18 at which the control pulse pres_sh is set to "L", the control pulse p_spbias is set to "L", the switch 401 as the sampling unit 311 is turned off, and writing of the potential of the bias line pb into the capacitor 402 as the holding unit 310 is finished.

That is, in the state where the node 205 of the pixel to be subjected to the electronic shutter has a high potential and where the voltage of the pixel signal output line 206 has a voltage close to that in the initial state, the potential of the bias line pb (the gate voltage of the current source transistor 309) is written into the holding unit 310. At this time, the input level of the amplifier circuit 306 is in a state close to the initial state. Accordingly, the amplifier circuit 306 operates on the normal operating point, and the current source transistor 309 operates in the saturation region. Thus, according to the third embodiment, in the state where the current source transistor 309 is operating in the saturation region, the potential of the bias line pb is sampled and held, thereby allowing variation in gate voltage of the current source transistor 309 to be suppressed with respect to the reference potential. Accordingly, occurrence of line noise and a lateral smear due to difference of drop in voltage of the power source line concerning the column circuit on each row even when horizontal transfer of the pixel signal and reading of the pixel signal are concurrently performed. Accordingly, a high quality image can be provided.

Fourth Embodiment

Figure 8:
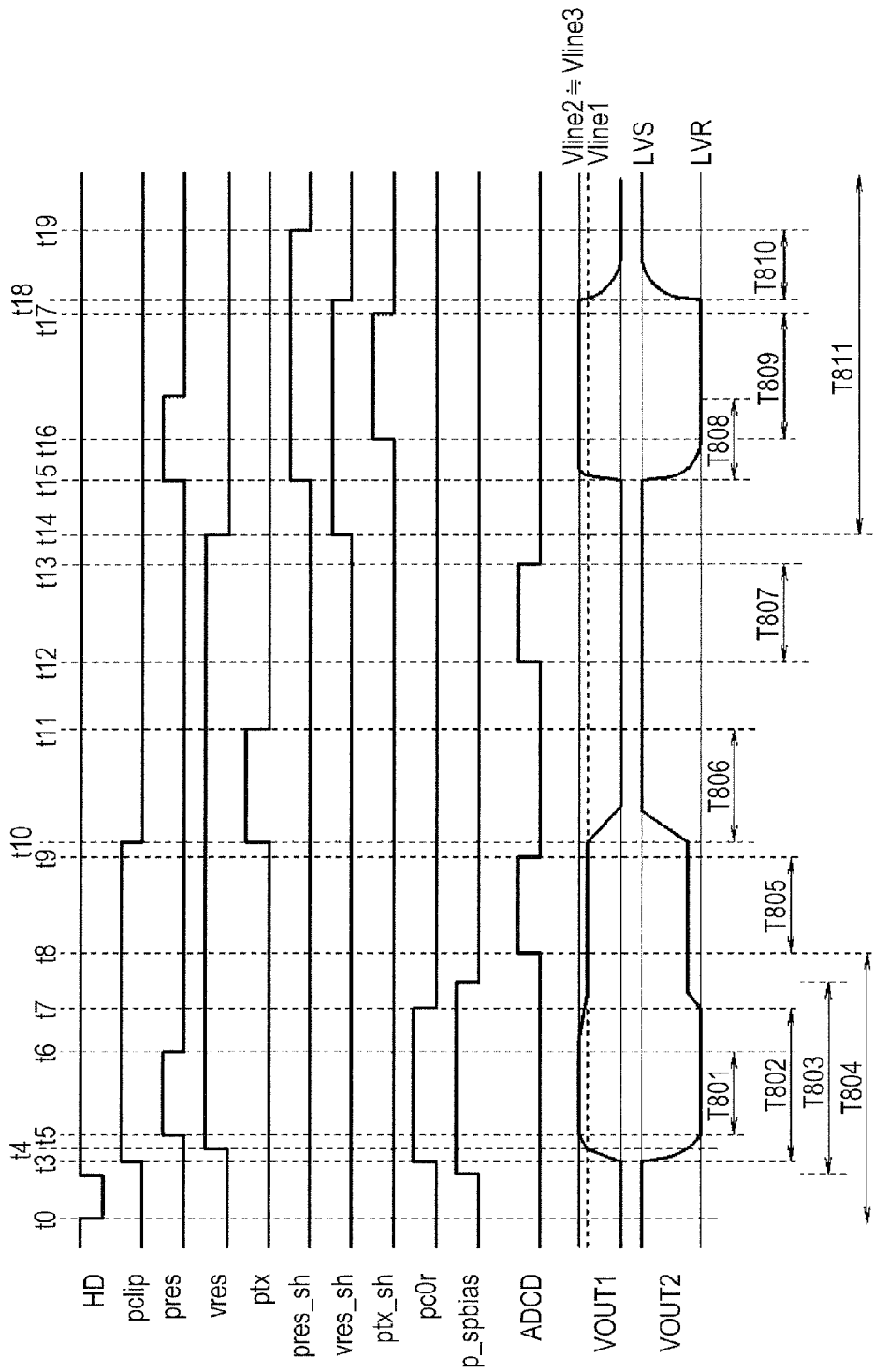
FIG. 8 is a diagram illustrating drive timing according to a fourth embodiment of the present invention.

FIG. 8 is a timing chart of drive timing of a solid-state imaging apparatus according to a fourth embodiment. Operations for each of control pulses and at time t0, t3 to t19 are analogous to those in the first embodiment. Accordingly, the description thereof is omitted. FIG. 8 illustrates a selecting operation period T801 for the pixel to be read, a reset period T802 for the amplifier circuit 306, a sampling period T803 for the gate voltage of the current source transistor 309 (the potential of the bias line pb), and a horizontal transfer period T804. The drawing also illustrates an A/D conversion period T805 for the N signal, a charge read out period T806 for the pixel to be read, an A/D conversion period T807 for the S signal, and a non-selecting operation period T808 for the pixel to be read. The drawing further illustrates an electronic shutter period T809, a non-selecting operation period T810 for the pixel to be subjected to the electronic shutter, and a horizontal transfer period T811.

In the fourth embodiment, as illustrates as the period T803 in FIG. 8, before time t3 at which the control pulse pclip is set to "H", the control pulse p_spbias is set to "H" and the switch 401 as the sampling unit 311 is turned on. Thus, writing of the potential of the bias line pb (the gate voltage of the current source transistor 309) into the capacitor 402 as the holding unit 310 is started. Before time t10 at which the control pulse pclip is set to "L" and before time t8 at which the A/D conversion process is started, the control pulse p_spbias is set to "L". Thus, the switch 401 as the sampling unit 311 is turned off, and writing of the potential of the bias line pb into the capacitor 402 as the holding unit 310 is finished.

In FIG. 8, at time t6 when the control pulse pres is set to "L", the voltage of the pixel signal output line 206 is start to decrease. This decrease indicates that charge overflows from the photoelectric conversion element 201 to the node 205 when the highly bright object is imaged or the photoelectric conversion element 201 is irradiated with light to thereby reduce the potential of the node 205. At this time, during a period when the control pulse pclip is "H", the voltage of the pixel signal output line 206 is not reduced below the voltage Vline1 owing to an operation of the clip transistor 302.

As illustrated in FIG. 8, if the voltage of the pixel signal output line 206 is changed by imaging of the highly bright object at and after time t7 when resetting of the amplifier circuit 306 is finished, the output of the amplifier circuit 306 is increased. However, as described above, the voltage of the pixel signal output line 206 is not reduced below the voltage Vline1 owing to the operation of the clip transistor 302.

Accordingly, the output of the amplifier circuit 306 is not saturated, and the current source transistor 309 does not operate according to the linear operation.

Thus, according to the fourth embodiment, in a period during which the gate voltage of the clip transistor 302 is high, the potential of the bias line pb (the gate voltage of the current source transistor 309) is sampled and held. Thus, variation in gate voltage with respect to the reference potential of the current source transistor 309 can be suppressed. Accordingly, occurrence of line noise and a lateral smear due to difference of drop in voltage of the power source line concerning the column circuit on each row even when horizontal transfer of the pixel signal and reading of the pixel signal are concurrently performed. Accordingly, a high quality image can be provided.

The first to fourth embodiments have specified rising of the control pulses p_spbias. However, the rising position is not limited thereto, and can be freely set instead. Furthermore, one time per HD has been described. More specifically, the voltage of the bias line pb is written into the holding unit 310 one time per HD. However, writing per HD is not necessary. For instance, writing may be performed one time per frame.

The embodiments have only described the examples of specific implementation of the present invention. The technical scope of the present invention should not be construed in a limited manner. That is, the present invention can be implemented in various forms without departing from the technical spirit or main characteristics thereof.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-223340, filed Oct. 7, 2011, which is hereby incorporated by reference herein in its entirety.

What is claimed is:

1. A solid-state imaging apparatus, comprising:
   a plurality of pixels arranged in a matrix;
   a plurality of amplifier circuits each arranged correspondingly to each of columns of the pixels, the amplifier configured to amplify a signal from the pixel;
   a current source transistor arranged correspondingly to each of amplifier circuits, the current source transistor configured to supply a bias current to a corresponding one of the amplifier circuits, and the current source transistor having a source supplied with a power source voltage;
   a sampling unit configured to sample, as a sampling voltage, a gate voltage of the current source transistor supplied from a bias line; and
   a holding unit configured to hold the voltage sampled by the sampling unit, and control a gate voltage thereafter of the current source transistor into the sampling voltage, wherein
   in a period of operating the current source transistor in a saturation region, the gate voltage of the current source transistor is sampled and held, and
   during a period of resetting the amplifier circuit, the gate voltage of the current source transistor is sampled and held.

2. The solid-state imaging apparatus according to claim 1, wherein
   the sampling unit has a switch configured to control a connection between the bias line and a gate of the current source transistor, and
   the holding unit has a capacitor connected between a source and the gate of the current source transistor.

3. A solid-state imaging apparatus, comprising:
   a plurality of pixels arranged in a matrix;
   a plurality of amplifier circuits each arranged correspondingly to each of columns of the pixels, the amplifier configured to amplify a signal from the pixel;
   a current source transistor arranged correspondingly to each of amplifier circuits, the current source transistor configured to supply a bias current to a corresponding one of the amplifier circuits, and the current source transistor having a source supplied with a power source voltage;
   a sampling unit configured to sample, as a sampling voltage, a gate voltage of the current source transistor supplied from a bias line;
   a holding unit configured to hold the voltage sampled by the sampling unit, and control a gate voltage thereafter of the current source transistor into the sampling voltage; and
   a voltage fixing unit configured to maintain, at a predetermined voltage, an input of the amplifier circuit, wherein
   in a period of operating the current source transistor in a saturation region, the gate voltage of the current source transistor is sampled and held, and
   during a period of fixing, at the predetermined voltage, the input of the amplifier circuit by operating the voltage maintaining unit, the gate voltage of the current source transistor is sampled and held.

4. The solid-state imaging apparatus according to claim 3, wherein
   the sampling unit has a switch configured to control a connection between the bias line and a gate of the current source transistor, and
   the holding unit has a capacitor connected between a source and the gate of the current source transistor.

5. A solid-state imaging apparatus, comprising:
   a plurality of pixels arranged in a matrix;
   a plurality of amplifier circuits each arranged correspondingly to each of columns of the pixels, the amplifier configured to amplify a signal from the pixel;
   a current source transistor arranged correspondingly to each of amplifier circuits, the current source transistor configured to supply a bias current to a corresponding one of the amplifier circuits, and the current source transistor having a source supplied with a power source voltage;
   a sampling unit configured to sample, as a sampling voltage, a gate voltage of the current source transistor supplied from a bias line; and
   a holding unit configured to hold the voltage sampled by the sampling unit, and control a gate voltage thereafter of the current source transistor into the sampling voltage, wherein
   in a period of operating the current source transistor in a saturation region, the gate voltage of the current source transistor is sampled and held, and
   during a period of resetting the pixel by an electronic shutter, the gate voltage of the current source transistor is sampled and held.

6. The solid-state imaging apparatus according to claim 5, wherein
   the sampling unit has a switch configured to control a connection between the bias line and a gate of the current source transistor, and
   the holding unit has a capacitor connected between a source and the gate of the current source transistor.

7. A solid-state imaging apparatus, comprising:
a plurality of pixels arranged in a matrix, the pixels comprising a photoelectric conversion element, a transfer switch configured to transfer a signal generated by a photoelectric conversion in the photoelectric conversion element to a floating diffusion portion, a reset switch for resetting the floating diffusion portion, and an amplifier transistor having a gate connected to the floating diffusion portion;
a plurality of amplifier circuits each arranged correspondingly to each of columns of the pixels, the amplifier configured to amplify a signal from the pixel;
a current source transistor arranged correspondingly to each of amplifier circuits, the current source transistor configured to supply a bias current to a corresponding one of the amplifier circuits, and the current source transistor having a source supplied with a power source voltage;
a sampling unit configured to sample, as a sampling voltage, a gate voltage of the current source transistor supplied from a bias line; and
a holding unit configured to hold the voltage sampled by the sampling unit, and control a gate voltage thereafter of the current source transistor into the sampling voltage, wherein
in a period of operating the current source transistor in a saturation region, the gate voltage of the current source transistor is sampled and held, and
during a period of resetting the floating diffusion portion, the gate voltage of the current source transistor is sampled and held.

8. The solid-state imaging apparatus according to claim 7, wherein
the sampling unit has a switch configured to control a connection between the bias line and a gate of the current source transistor, and
the holding unit has a capacitor connected between a source and the gate of the current source transistor.

9. A solid-state imaging apparatus, comprising:
a plurality of pixels arranged in a matrix, the pixels comprising a photoelectric conversion element, a transfer switch configured to transfer a signal generated by a photoelectric conversion in the photoelectric conversion element to a floating diffusion portion, a reset switch for resetting the floating diffusion portion, and an amplifier transistor having a gate connected to the floating diffusion portion;
a plurality of amplifier circuits each arranged correspondingly to each of columns of the pixels, the amplifier configured to amplify a signal from the pixel;
a current source transistor arranged correspondingly to each of amplifier circuits, the current source transistor configured to supply a bias current to a corresponding one of the amplifier circuits, and the current source transistor having a source supplied with a power source voltage;
a sampling unit configured to sample, as a sampling voltage, a gate voltage of the current source transistor supplied from a bias line; and
a holding unit configured to hold the voltage sampled by the sampling unit, and control a gate voltage thereafter of the current source transistor into the sampling voltage, wherein
in a period of operating the current source transistor in a saturation region, the gate voltage of the current source transistor is sampled and held, and
after completing of resetting the floating diffusion portion, the gate voltage of the current source transistor is sampled and held.

10. A driving method of a solid-state imaging apparatus comprising a plurality of pixels arranged in a matrix; a plurality of amplifier circuits each arranged correspondingly to each of columns of the pixels, the amplifier configured to amplify a signal from the pixel; and a current source transistor arranged correspondingly to each of amplifier circuits, the current source transistor configured to supply a bias current to a corresponding one of the amplifier circuits, and the current source transistor having a source supplied with a power source voltage, the driving method comprising:
sampling, as a sampling voltage, a gate voltage of the current source transistor supplied from a bias line; and
holding the voltage sampled in the sampling, and control a gate voltage thereafter of the current source transistor into the sampling voltage, wherein
in a period of operating the current source transistor in a saturation region, the gate voltage of the current source transistor is sampled and held, and
during a period of resetting the amplifier circuit, the gate voltage of the current source transistor is sampled and held.

11. A driving method of a solid-state imaging apparatus comprising a plurality of pixels arranged in a matrix, the pixels comprising a photoelectric conversion element, a transfer switch configured to transfer a signal generated by a photoelectric conversion in the photoelectric conversion element to a floating diffusion portion, a reset switch for resetting the floating diffusion portion, and an amplifier transistor having a gate connected to the floating diffusion portion; a plurality of amplifier circuits each arranged correspondingly to each of columns of the pixels, the amplifier configured to amplify a signal from the pixel; and a current source transistor arranged correspondingly to each of amplifier circuits, the current source transistor configured to supply a bias current to a corresponding one of the amplifier circuits, and the current source transistor having a source supplied with a power source voltage, the driving method comprising:
sampling, as a sampling voltage, a gate voltage of the current source transistor supplied from a bias line; and
holding the voltage sampled in the sampling, and controlling a gate voltage thereafter of the current source transistor into the sampling voltage, wherein
in a period of operating the current source transistor in a saturation region, the gate voltage of the current source transistor is sampled and held, and
during a period of resetting the floating diffusion portion, the gate voltage of the current source transistor is sampled and held.

12. A driving method of a solid-state imaging apparatus comprising a plurality of pixels arranged in a matrix, the pixels comprising a photoelectric conversion element, a transfer switch configured to transfer a signal generated by a photoelectric conversion in the photoelectric conversion element to a floating diffusion portion, a reset switch for resetting the floating diffusion portion, and an amplifier transistor having a gate connected to the floating diffusion portion; a plurality of amplifier circuits each arranged correspondingly to each of columns of the pixels, the amplifier configured to amplify a signal from the pixel; and a current source transistor arranged correspondingly to each of amplifier circuits, the current source transistor configured to supply a bias current to a corresponding one of the amplifier circuits, and the current source transistor having a source supplied with a power source voltage, the driving method comprising:

sampling, as a sampling voltage, a gate voltage of the current source transistor supplied from a bias line; and holding the voltage sampled by the sampling, and control a gate voltage thereafter of the current source transistor into the sampling voltage, wherein in a period of operating the current source transistor in a saturation region, the gate voltage of the current source transistor is sampled and held, and after completing of resetting the floating diffusion portion, the gate voltage of the current source transistor is sampled and held.

* * * * *